United States Patent [19]

Alberts et al.

[11] Patent Number: 5,256,223

[45] Date of Patent: Oct. 26, 1993

[54] FIBER ENHANCEMENT OF VISCOELASTIC DAMPING POLYMERS

[75] Inventors: Thomas E. Alberts, Virginia Beach, Va.; Yung Chen, Chicago, Ill.

[73] Assignee: The Center for Innovative Technology, Herndon, Va.

[21] Appl. No.: 816,886

[22] Filed: Dec. 31, 1991

[51] Int. Cl.$^5$ .................. E04B 1/98; D04H 5/04
[52] U.S. Cl. ........................... 156/71; 52/403; 181/208; 248/636; 248/638; 267/141; 277/227; 428/294; 428/343
[58] Field of Search ............ 156/71, 60, 276; 267/141, 148; 52/309.6, 309.7, 403, 167 R; 248/636, 638; 181/208; 428/294, 343; 277/227

[56] References Cited

U.S. PATENT DOCUMENTS

| | | | |
|---|---|---|---|
| 3,217,832 | 11/1965 | Whitney | 181/208 |
| 3,499,255 | 3/1970 | Sweeney et al. | 52/403 X |
| 3,821,059 | 6/1974 | Hensel | 52/309.7 X |
| 4,006,892 | 2/1977 | Koeneman | 267/141 X |
| 4,118,258 | 10/1978 | Graveron et al. | 156/71 X |
| 4,278,726 | 7/1981 | Wieme | 248/638 X |
| 4,545,466 | 10/1985 | Izeki et al. | 248/636 X |
| 4,626,730 | 12/1986 | Hubbard, Jr. | 310/317 X |
| 4,734,323 | 3/1988 | Sato et al. | 181/208 X |
| 4,859,523 | 8/1989 | Endoh et al. | 428/215 |
| 4,954,375 | 9/1990 | Sattinger et al. | 52/403 X |
| 4,954,377 | 9/1990 | Fischer et al. | 267/141 X |
| 5,108,802 | 4/1992 | Sattinger | 52/403 X |

OTHER PUBLICATIONS

Plunkett et al., "Length Optimization for Constrained Viscoelastic Layer Damping," Jour. of the Acoustical Society of America, vol. 48, No. 1 (Part 2), 1970.

Petrie, "Constrained Layer Damping with Advanced Composites" 11th National Sampe Tec. Conference, Nov., 1979.

Flaggs et al., "Analysis of the Viscoelastic Response of Composite Laminates During Hygrothermal Exposure," J. Comp. Materials, vol. 15, Jan. 1981, pp. 21–40.

Sternstein et al., "Viscoelastic Characterization of Neat Resins and Composites," Polymer Preprints, vol. 25, No. 2, Aug. 1984, pp. 201–202.

Stango et al., "A Note on Analytical Representation of Anisotropic Viscoelastic Constitutive Equations for Fiber-reinforced Composites," Composites Science and Technology, vol. 35, No. 3, 1989.

Cardon et al., "Nonlinear Viscoelastic Behavior of Epoxy-Matrix Composites Under Combined Mechanical and Environmental Loadings," pp. 619–623.

Lin et al., "Thermo-Viscoelastic Response of Graphite/Epoxy Composites," Journal of Engineering Materials and Technology, vol. 110, Apr. 1988, pp. 113–116.

Primary Examiner—David A. Simmons
Assistant Examiner—Mark A. Osele
Attorney, Agent, or Firm—Whitham & Marhoefer

[57] ABSTRACT

A Viscoelastic medium with fibers dispersed throughout eliminates the need for a constraining layer, thus reducing the size and weight of a damping treatment.

10 Claims, 4 Drawing Sheets

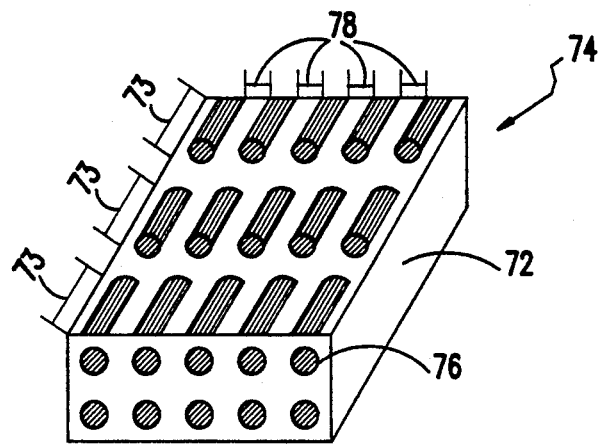
FIG.5
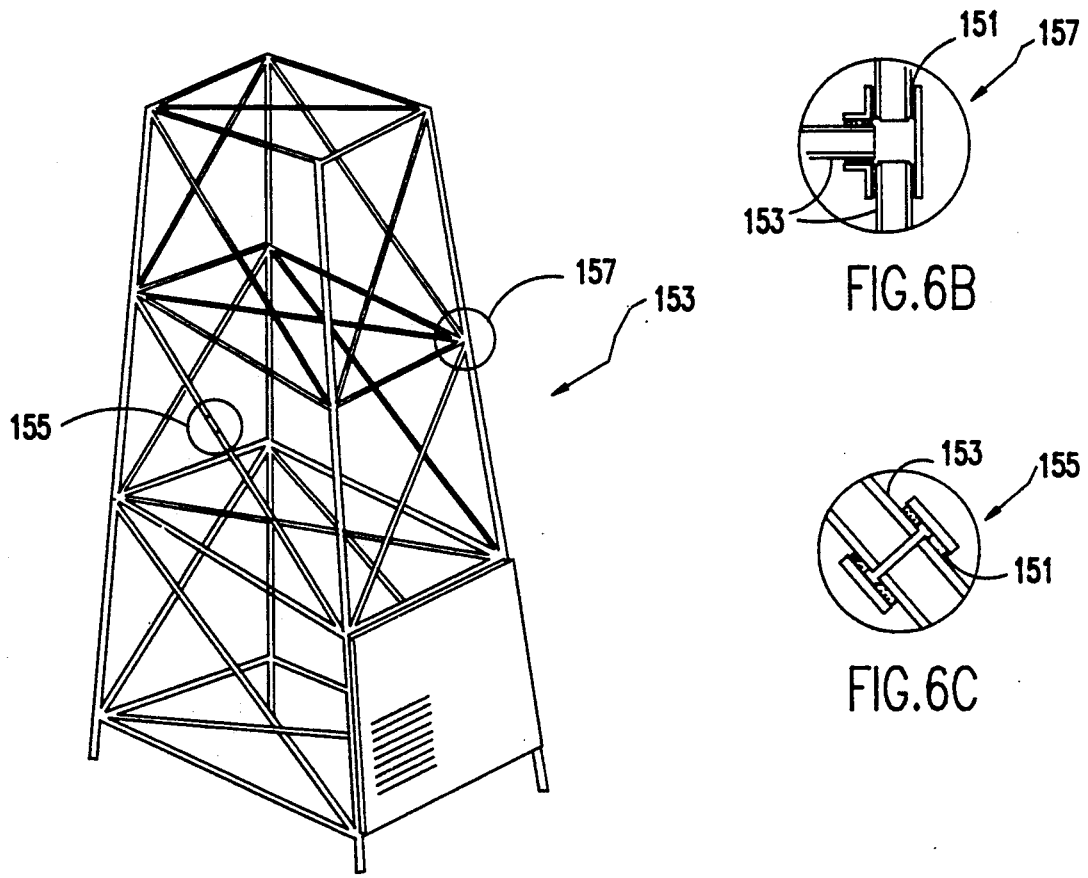
FIG.6A
FIG.6B
FIG.6C

FIBER ENHANCEMENT OF VISCOELASTIC DAMPING POLYMERS

BACKGROUND OF THE INVENTION

1. Field of the Invention

The present invention is generally related to viscoelastic damping treatments and, more particularly, to a damping treatment which utilizes fibers dispersed throughout a viscoelastic medium to increase shear strain without the need for a constraining layer.

2. Description of the Prior Art

It is well known that constrained viscoelastic layer damping treatments provide an effective means of passive control for structural vibration. The fundamental principle behind viscoelastic damping treatments is the conversion of structural vibration energy into heat by inducing strain in the viscoelastic layer. Viscoelastic damping is exhibited strongly in many polymeric materials. Polymeric materials are made up of long molecular chains. The damping arises from the relaxation and recovery of the polymer network after it has been deformed. As shown in FIG. 1A, a typical damping treatment is comprised of a viscoelastic layer 3 which in turn has an elastic constraining layer 5 bonded to a top surface 7 to form a "sandwich-like" arrangement 9. The arrangement 9 is often manufactured as a tape, having an adhesive surface 11 which may be bonded to the surface of a structure 13.

The constraining layer 5 is much stiffer than the viscoelastic layer 3, so that when the structure 13 vibrates, the constraining layer 5 experiences relatively small deformations, thereby inducing shear strain in the viscoelastic layer. FIG. 1B illustrates that when the substrate material 13 experiences an axial deformation 15, the viscoelastic layer 3 experiences shear strain. Thus, the constraining layer 5 leads to a substantial net increase in viscoelastic layer strain energy as compared to the unconstrained case. Since the structural damping contributed by the structure 13 and the constraining layer 5 is very small, it is generally assumed that the energy lost is related to the shear strain of the viscoelastic layer 3 alone. This lost strain energy is converted to heat and dissipated to provide the desired mechanical damping for the structure 13.

Constrained layer damping treatments most commonly use spatially continuous constraining layers over the entire viscoelastic layer. FIG. 2A shows a continuous constraining layer 25 bonded to a viscoelastic layer 23 to form a tape 27 which, in turn, is bonded to a beam 33 subjected to a bending deformation. However, it is also well-known that in some cases it is the constraining layer length which influences the resultant damping more than the amount of damping material used, as discussed by Plunkett and Lee, "Length Optimization for Constrained Viscoelastic Layer Damping" J. Accoustic Soc'y of Am., Vol. 48, No. 1, at 150-61 (1970). For example, in FIG. 2A, if the constraining layer is very long, then the stress imposed by its endpoints 29 will induce axial strain in most of the constraining layer 25 that is nearly equal to that of the base structure 33. Accordingly, relatively little shear is induced in the viscoelastic layer 23 except near the constraining layer's endpoints 29. Because the greater part of the viscoelastic layer 23 is not undergoing shear strain, the structure 33 is not effectively damped. This condition may be remedied by segmenting the constraining layer 25, as shown in FIG. 2B, into sections 31 of prescribed length 34 such that optimal damping is achieved at a specified design frequency. However, length optimization is generally a tedious method which requires the application of a viscoelastic layer to a surface followed by the careful application of sections of constraining layer on top of the viscoelastic layer.

If multiple layers of polymers which exhibit viscoelastic properties are employed as illustrated in FIG. 3, the damping can be further increased. When the structure 13 vibrates, the layers of constraining material 5 create a large magnitude shearing force throughout the layers of viscoelastic material 53 which are sandwiched in-between the structure 13 and the constraining layers 5. Because there is an increase in the volume of viscoelastic material 53 which is subject to shearing deformation, the net strain energy in viscoelastic material 53 is increased and, therefore, improved damping in achieved. However, with increasing layers of viscoelastic material 53, both the weight and size of the treatment increases, and additional constraining layers 5 must be employed.

SUMMARY OF THE INVENTION

It is therefore an object of the present invention to provide a damping treatment which weighs less and occupies less space than the conventional constrained viscoelastic layer damping treatments and is at least as effective as conventional damping treatments.

It is another object of the present invention to provide an apparatus for damping structural noise and vibration which is ready to apply directly to a structure without the need for a constraining layer.

According to the invention, fibers are added to a viscoelastic material during the manufacturing process to form a polymeric treatment which is ready to apply directly to a structure. The damping qualities of the treatment may be optimized by adjusting the spacing between and/or length of fibers either during or after the manufacturing process. The resulting treatment provides enhanced damping qualities without the need for a constraining layer.

BRIEF DESCRIPTION OF THE DRAWINGS

The foregoing and other objects, aspects and advantages will be better understood from the following detailed description of the preferred embodiments of the invention with reference to the drawings, in which:

FIG. 5 is a perspective view of a viscoelastic damping treatment containing fibers which have been cut;

FIGS. 6A-C show the use of a damping treatment in a truss structure.

DETAILED DESCRIPTION OF THE PREFERRED EMBODIMENTS OF THE INVENTION

Figure 4:
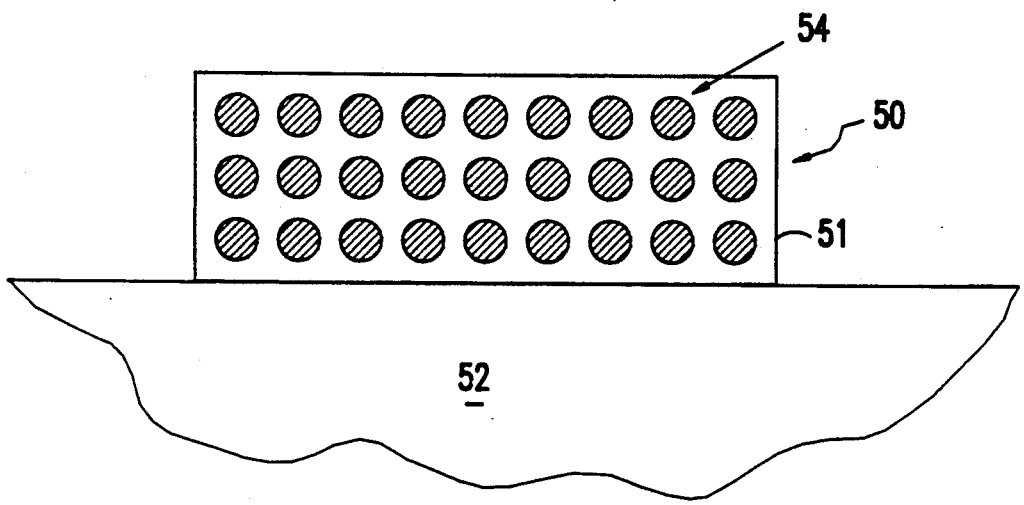
FIG. 4 is a cross-sectional side view of a viscoelastic damping treatment having a fiber enhancement.

Referring now to the drawings, and more particularly to FIG. 4, a fiber enhanced damping treatment is shown. The treatment is comprised of a composite material 50 which includes a viscoelastic material 51 through which fibers 54 have been dispersed during the manufacturing process. The fibers 54 provide an increased shear strain in the viscoelastic material 51, which is analagous to the shear strain provided by the addition of a conventional constraining layer on top of a viscoelastic layer. The thickness of the fibers 54 is typically on the order of microns. Consequently, by dispersing the fibers 54 throughout the viscoelastic material 51, relatively the same volume is occupied by both the fibers 54 and the viscoelastic material 51 as was originally occupied solely by the viscoelastic material 51. The resulting treatment provides damping to a structure 52 without the need to add an additional layer of constraining material.

In a preferred embodiment, shown in FIG. 5, the invention contemplates optimizing the length of the fibers 76 dispersed throughout the viscoelastic material 72 during the manufacturing process. Thus, the treatment 74 is comprised of a single sheet of material containing fibers 76 which have been precut according to certain design specifications. The cut fibers 76 may be ordered, as shown, or randomly dispersed. However, the spacing 78 between the fibers 76 will average some predetermined design constant in order to provide a certain volume fraction of fibers 76 within the viscoelastic material 72. Alternatively, where a certain volume fraction has not been specified prior to manufacture, the treatment 74 may be manufactured with uncut fibers. The entire treatment 74 is then cut either prior to or after securing it to a surface to provide fibers having a length which is tailored to the particular damping application. Therefore, the embodiment of FIG. 5 enables the manufacture of damping treatments which may be directly applied to a structure to provide a level of damping designed for a specific application, without the need for application of an additional constraining layer.

Figure 1A:
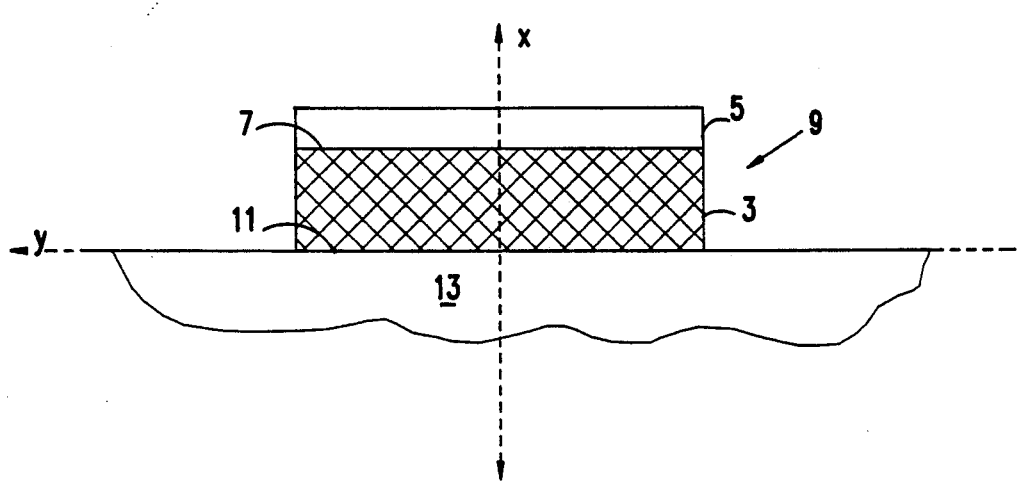
FIG. 1A is a cross-sectional side view of a portion of a prior art viscoelastic damping treatment under a constraining layer segment.
Figure 1B:
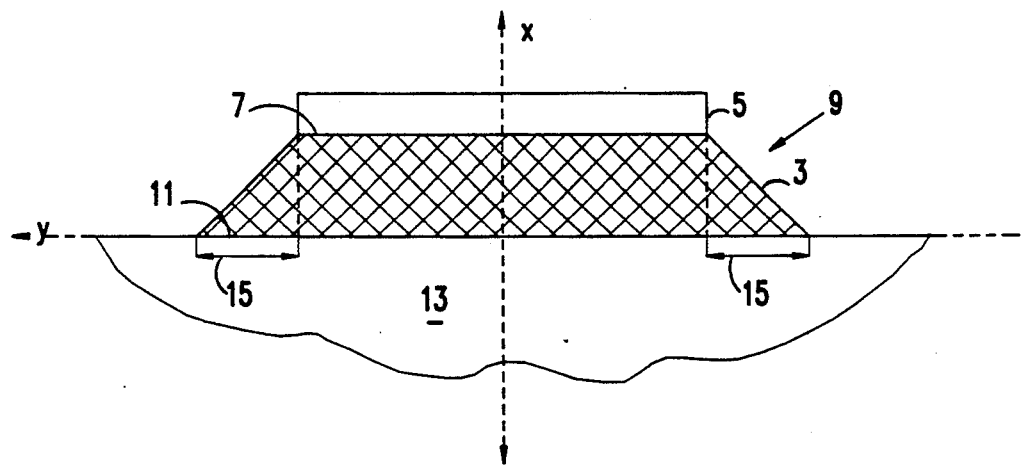
FIG. 1B is a cross-sectional side view of a portion of a prior art viscoelastic damping treatment under a constraining layer segment after the surface of the basic structure has deformed.
Figure 2A:
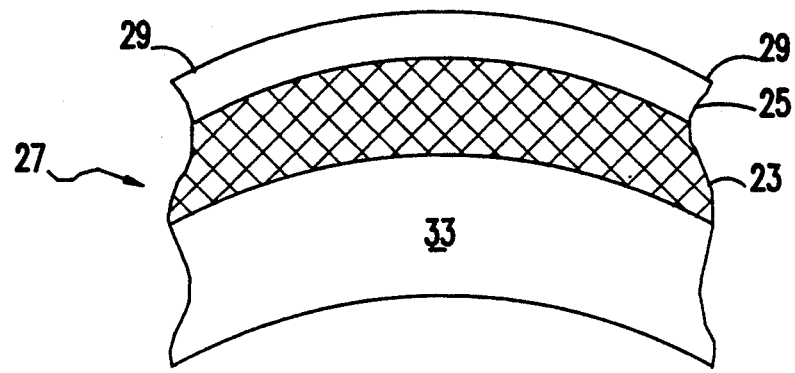
FIG. 2A is a cross-sectional side view of a continuous constrained layer treatment as applied to a beam under bending deformation.
Figure 2B:
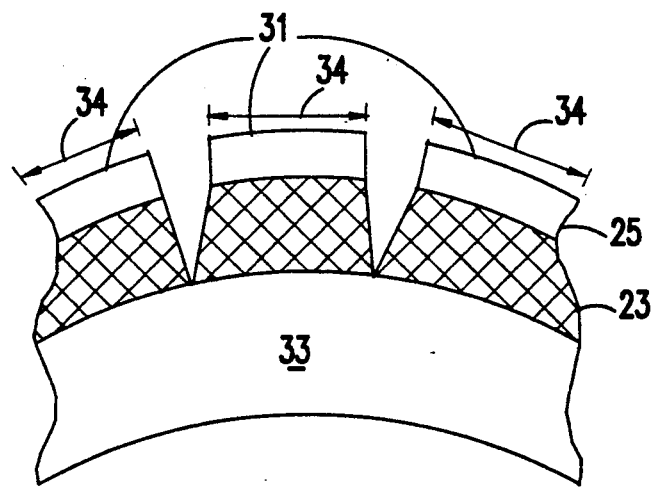
FIG. 2B is a cross-sectional side view of a segmented constrained layer treatment as applied to a beam under bending deformation.
Figure 3:
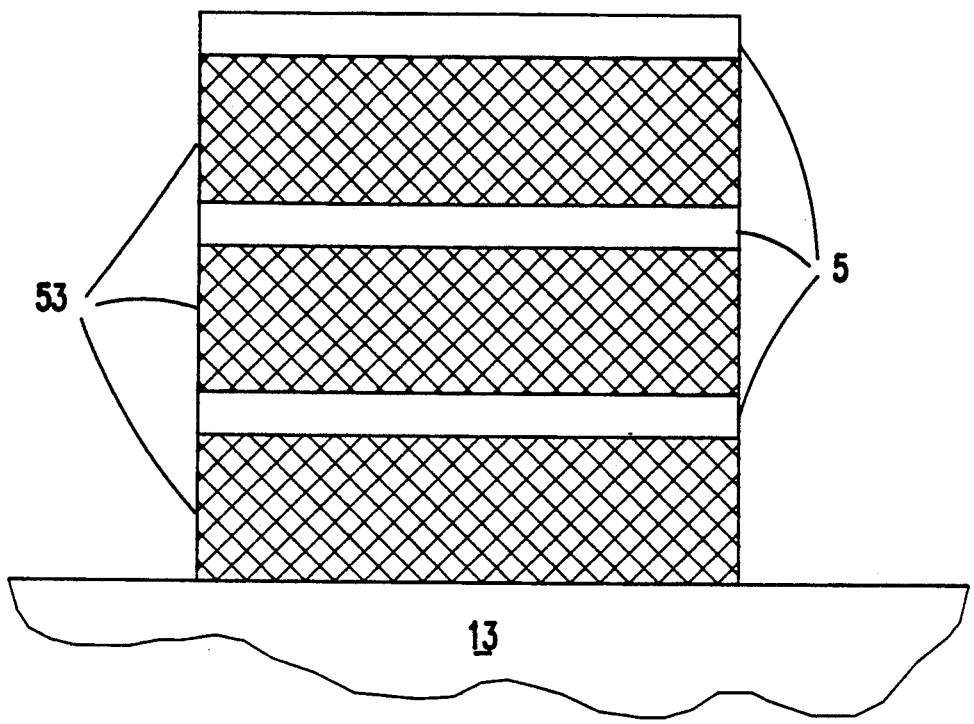
FIG. 3 is a cross-sectional side view of a multi-layer damping treatment.

In addition to the preferred embodiment shown in FIG. 5, fibers may be used to enhance the damping properties of any of the configurations shown in FIGS. 1-3 and any other damping treatments employing viscoelastic materials. The fibers may be dispersed randomly or in a specified order, as well as throughout the treatment or only in various sections. The invention may be used as a surface treatment in any structure which is prone to vibration, such as aircraft, automobiles, ships, jet engines, robotic manipulators and computer disk drives, or as discrete dampers in truss structures (i.e., any large joint dominated structures having compression and tension members) such as bridges or skyscrapers.

The present invention is particularly advantageous when used in a truss structure, shown in FIG. 6A, where the application of the damping treatment as discrete dampers designed into the load paths of the truss members 153 is required. Generally, during vibration of a truss structure, tension and compression forces are generated in the truss members 153. As a result of the relative motion of the members 153 which is caused by the tension and compression forces, the viscoelastic material 151 which is placed in the load paths, as shown in FIGS. 6B and 6C, is sheared. By varying the spacing between and/or lengths of fibers in the viscoelastic material, it is possible to achieve optimal damping in truss structures similar to the constrained layer section length optimization techniques used in the prior art surface damping treatments which are primarily designed for bending deformations. FIGS. 6B-C show two examples of discrete dampers in a truss structure. FIG. 6B shows the application of the damping treatment 151 in the joints 157 of the truss structure, which works directly on the axial deformation of the truss members 153. FIG. 6C shows the addition of the treatment 151 to the middle of a truss member 155, which effectively creates a new joint. This method provides damping without reducing any rigidity in the joints 157.

Material damping is generally a complex function of frequency, temperature, type of deformation, amplitude and structural geometry. Consequently, any number of viscoelastic materials can be used to provide the desired damping, strength, durability, creep resistance, thermal stability and other desirable properties, over selected temperature and frequency ranges. For example, several specially designed viscoelastic damping materials are ISD 110 and ISD 112 acrylic polymers which are manufactured by Minnesota Mining and Manufacturing, and sold under the trademark Scotch Stamp ®, and SMRD110F90 which is manufactured by General Electric . The fibers may be glass, Kevlar ®, an aramide material available from DuPont, or the like, but are preferably graphite fibers having a high elastic modulus (>100 million psi). Graphite fibers are available from numerous sources such as Hercules.

While the invention has been described in terms of several preferred embodiments which can be used singly or in combination, those skilled in the art will recognize that the invention can be practiced with modification within the spirit and scope of the appended claims.

We claim:

1. An apparatus for damping structural noise and vibration, consisting essentially of:
   a viscoelastic polymer having length, width and height dimensions defining a volume and having at least one surface securable to a structure; and
   a plurality of non-woven, spaced apart fibers uniformly distributed in-situ throughout said volume defined by said viscoelastic polymer with respect to said height dimension, said fibers being sized to induce strain in said viscoelastic polymer, said fibers being of a length which requires several of said fibers to span said length dimension of said viscoelastic polymer.

2. The apparatus of claim 1, wherein said securable surface includes an adhesive bonded thereto.

3. The apparatus of claim 1 wherein said fibers are shorter than said length dimension of said polymer.

4. The apparatus of claim 1 wherein said fibers are graphite fibers.

5. The apparatus of claim 1 wherein said volume which includes said viscoelastic polymer and said fibers is in the form of a tape.

6. An apparatus as recited in claim 1 wherein said viscoelastic polymer includes a plurality of regions along its length dimension with fibers therein and a plurality of regions along its length dimension without fibers.

7. A method of damping structural noise and vibration, comprising the steps of:
   determining a fiber length for a damping tape which is comprised of a viscoelastic polymer with a plurality of spaced apart fibers uniformly distributed throughout said viscoelastic polymer which will provide a desired damping response for a particular frequency of vibration; and
   applying said damping tape having said fiber length determined to produce said desired damping response to a structure.

8. A method as recited in claim 7 wherein said step of applying includes the steps of securing a damping tape with uncut fibers to said structure, and cutting said uncut fibers to said fiber length after said step of securing.

9. A method of damping structural noise and vibration, comprising the steps of:
   determining a fiber spacing for a damping tape which is comprised of a vescoelastic polymer with a plurality of spaced apart fibers uniformly distributed throughout said viscoelastic polymer which will provide a desired damping response for a particular frequency of vibration; and
   applying said damping tape having said fiber spacing determined to produce said desired damping response to a structure.

10. A method of damping structural noise and vibration, comprising the steps of:
   determining a volume fraction of fibers for a damping tape which is comprised of a viscoelastic polymer with a plurality of spaced apart fibers uniformly distributed throughout said viscoelastic polymer which will provide a desired damping response for a particular frequency of vibration; and
   applying said damping tape having said volume fraction of fibers determined to produce said desired damping response to a structure.

* * * * *

UNITED STATES PATENT AND TRADEMARK OFFICE
CERTIFICATE OF CORRECTION

PATENT NO. : 5,256,223
DATED : October 26, 1993
INVENTOR(S) : Alberts, et al.

It is certified that error appears in the above-indentified patent and that said Letters Patent is hereby corrected as shown below:

Column 1, line 3 inserted: "This invention was made with government support under contract No. NAS1-18687 awarded by the National Aeronautic and Space Administration. The government has certain rights in this patent."

Signed and Sealed this

Fourth Day of April, 1995

Attest:

BRUCE LEHMAN

*Attesting Officer*       *Commissioner of Patents and Trademarks*